United States Patent
Fattah

(10) Patent No.: US 10,917,353 B2
(45) Date of Patent: Feb. 9, 2021

(54) NETWORK TRAFFIC FLOW LOGGING IN DISTRIBUTED COMPUTING SYSTEMS

(71) Applicant: MICROSOFT TECHNOLOGY LICENSING, LLC, Redmond, WA (US)

(72) Inventor: Hossam Fattah, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/103,790

(22) Filed: Aug. 14, 2018

(65) Prior Publication Data

US 2019/0268270 A1  Aug. 29, 2019

Related U.S. Application Data

(60) Provisional application No. 62/636,826, filed on Feb. 28, 2018.

(51) Int. Cl.
*H04L 12/819* (2013.01)
*H04L 12/863* (2013.01)
*H04L 12/26* (2006.01)

(52) U.S. Cl.
CPC ........... *H04L 47/215* (2013.01); *H04L 43/04* (2013.01); *H04L 47/6255* (2013.01)

(58) Field of Classification Search
CPC ... H04L 47/215; H04L 47/6255; H04L 43/04; H04L 43/026; H04L 41/046; H04L 43/12; H04L 43/02; Y02D 30/50
See application file for complete search history.

(56) References Cited

U.S. PATENT DOCUMENTS

| | | | |
|---|---|---|---|
| 2005/0129019 A1* | 6/2005 | Cheriton | H04L 63/101 370/392 |
| 2009/0049196 A1* | 2/2009 | Smith | H04L 63/083 709/245 |

(Continued)

OTHER PUBLICATIONS

"TR-518 Relationship of SDN and NFV", Retrieved from: http://www.hit.bme.hu/~jakab/edu/litr/SDN/onf2015.310_Architectural_comparison_Relationship_of SDN_and_NFV.08-2.pdf, Oct. 2015, 20 Pages.

(Continued)

*Primary Examiner* — Gregory B Sefcheck
*Assistant Examiner* — Joshua Smith
(74) *Attorney, Agent, or Firm* — Newport IP, LLC; Han Gim

(57) ABSTRACT

In various embodiments, methods and systems for implementing network traffic flow logging in a distributed computing system are provided. At a high level, the network traffic flow logger is implemented using a network traffic flow logger framework that includes a plurality of modular network traffic flow logging objects for adjustable processing of network flow events. In operation, a plurality of tokens is counted at a first throttling rate. The first throttling rate is associated with a maximum number of tokens threshold. The maximum number of tokens threshold is an adjustable threshold. A flow event is accessed, where flow events are quantified based on tokens. The flow event is queued, based on a count of the plurality of tokens or the maximum number of tokens threshold. Based on queueing the flow event, the first throttling rate is adjusted to a second throttling rate based on a queue length of the queue.

20 Claims, 14 Drawing Sheets

(56) References Cited

U.S. PATENT DOCUMENTS

| | | | | |
|---|---|---|---|---|
| 2010/0085874 | A1* | 4/2010 | Noy | H04L 47/10 |
| | | | | 370/230 |
| 2010/0208665 | A1* | 8/2010 | Vivanco | H04L 1/0025 |
| | | | | 370/329 |
| 2011/0243139 | A1* | 10/2011 | Nishimura | H04L 47/215 |
| | | | | 370/394 |
| 2014/0115325 | A1* | 4/2014 | Detienne | H04L 63/0209 |
| | | | | 713/160 |
| 2014/0244832 | A1* | 8/2014 | Beck | H04L 47/6295 |
| | | | | 709/224 |
| 2015/0012998 | A1* | 1/2015 | Nellikar | H04L 63/0245 |
| | | | | 726/13 |
| 2016/0337259 | A1* | 11/2016 | Li | H04L 47/215 |
| 2016/0359751 | A1* | 12/2016 | Wu | H04L 47/32 |
| 2017/0026417 | A1* | 1/2017 | Ermagan | H04L 63/0272 |
| 2017/0180254 | A1* | 6/2017 | Certain | H04L 43/0817 |
| 2017/0318097 | A1* | 11/2017 | Drew | H04L 67/16 |
| 2018/0324052 | A1* | 11/2018 | Nachimuthu | H04Q 9/00 |
| 2018/0367499 | A1* | 12/2018 | Bansal | H04L 61/30 |

OTHER PUBLICATIONS

"VPC Flow Logs", Retrieved from: https://web.archive.org/web/20150613053554/http://docs.aws.amazon.com/AmazonVPC/latest/UserGuide/flow-logs.html, Jun. 13, 2015, 16 Pages.

Addepalli, et al., "Network Function Virtualization Virtual Network Function Architecture", Retrieved from: https://www.etsi.org/deliver/etsi_gs/NFV-SWA/001_099/001/01.01.01_60/gs_NFV-SWA001v010101p.pdf, Dec. 2014, 93 Pages.

Bailey, et al., "SDN Architecture Overview", Retrieved from: https://www.opennetworking.org/wp-content/uploads/2013/02/SDN-architecture-overview-1.0.pdf, Dec. 12, 2013, 5 Pages.

Bertsekas, et al., "Data Networks", In Publication of Prentice Hall, Jan. 1992, 70 Pages.

Chiosi, et al., "Network Functions Virtualisation", Retrieved from: https://portal.etsi.org/NFV/NFV_White_Paper.pdf, Oct. 22, 2012, 16 Pages.

Firestone, Daniel, "Azure Virtual Filtering Platform VFP", Retrieved From: https://www.microsoft.com/en-us/research/project/azure-virtual-filtering-platform/, Sep. 1, 2011, 2 Pages.

Kendall, Davidg., "Stochastic Processes Occurring in the Theory of Queues and their Analysis by the Method of the Imbedded Markov Chain", In Journal of the Annals of Mathematical Statistics, vol. 24, No. 3, Sep. 1953, pp. 338-354.

Mckeown, et al., "OpenFlow: Enabling Innovation in Campus Network", In Journal of ACM SIGCOMM Computer Communication Review, vol. 38, Issue 2, Mar. 14, 2008, 6 Pages.

Mendonca, et al., "Introduction to Flow Logging for Network Security Ggroups", Retrieved from: https://docs.microsoft.com/en-us/azure/network-watcher/network-watcher-nsg-flow-logging-overview, Feb. 22, 2017, 14 Pages.

Mijumbi, et al., "Network Function Virtualization: State-of-the-Art and Research Challenges", In Proceedings of the IEEE Communications Surveys and Tutorials, vol. 18, Issue 1, Sep. 4, 2015, pp. 236-262.

Sahai, et al., "Network Function Virtualization Ecosystem Report on SDN Usage in NFV Architectural Framework", Retrieved from: https://www.etsi.org/deliver/etsi_gs/NFV-EVE/001_099/005/01.01.01_60/gs_NFV-EVE005v010101p.pdf, Dec. 2015, 125 Pages.

Van-Giang, et al., "SDN NFV-Based Mobile Packet Core Network Architectures A Survey", In Journal of IEEE Communications Surveys & Tutorials, vol. 19, Issue 3, Apr. 5, 2017, pp. 1567-1602.

* cited by examiner

NETWORK TRAFFIC FLOW LOGGING IN DISTRIBUTED COMPUTING SYSTEMS

CROSS-REFERENCE TO RELATED APPLICATION

This application claims priority to Provisional Patent Application No. 62/636,826, filed Feb. 28, 2018, and entitled "NETWORK TRAFFIC FLOW LOGGING IN DISTRIBUTED COMPUTING SYSTEMS," the entire contents of which is incorporated herein by reference it its entirety.

BACKGROUND

Users often rely on computing systems housed in data centers to perform computing tasks. Datacenters include network infrastructures that support communication to, from, and within the datacenters. Network Infrastructures in datacenters may be implemented using network virtualization. Network virtualization generally refers to combining hardware and software network resources and network functionality into a single, software-based administrative entity, a virtual network. Similar to traditional hardware-based networks, users of virtual networks (e.g., tenants of a distributed computing "cloud" computing environment) may track and analyze network traffic flow logs. For example, users of hardware-based network would track and analyze network traffic flow logs to take different types of actions, based on observed network activity, such as when suspicious network activity is identified. However, virtual networks may provide additional considerations for implementing network traffic flow logging and corresponding actions or operations. As such, improvements to different types of network traffic flow logging operations, data structures, and processes can provide better network traffic flow logging functionality.

SUMMARY

Embodiments of the present invention relate to methods, systems and computer storage media for providing network traffic flow logging in a distributed computing system for adjustable processing of network flow events. By way of background, tenants in distributed computing systems may want to track (e.g., store, view) and analyze their network traffic flows in order to take actions based on observed activity. For example, alerts may be triggered if suspicious activity or unusual network traffic patterns are identified in a network traffic flow of the infrastructure of the tenant. In distributed computing systems, traditional hardware-based networks have been superseded by network virtualization that combines hardware and software network resources and network functionality into a single, software-based administrative entity, a virtual network. Network virtualization involves platform virtualization (i.e., hardware) and resource virtualization (i.e., compute). Conventional network traffic flow logging systems unfortunately simply rely on traditional or outdated technology for network traffic flow logging techniques. For example, conventional network traffic flow logging systems depend on previously defined solutions based on hardware-based networking or simply do not leverage the combination of a plurality of modern technological advancements. Moreover, the properties of a virtual network (e.g., software-defined network, hardware, and resource virtualization) and innovations in modern technology can be leveraged for improvements in the operations, data structures, and for providing network traffic flow logging functionality. As such, the present invention addresses the limitations of conventional network traffic logging.

Embodiments described in the present disclosure are directed towards improving network traffic flow logging using a novel network traffic flow logger for adjustable processing of network flow events. At a high level, the network traffic flow logger implements a token bucket having variable capacity, a queue model based on arrival rates of flow events, service times of flow events, number of servers serving flow event, and a queue length, a throttling rate configurable as a continuous-time adjustment throttling rate or a discrete-time adjustment throttling rate to provide network flow logging.

The network traffic flow logger is implemented using a network traffic flow logger framework that includes a plurality of modular network traffic flow logging objects that are features or operable in virtual networks and network virtualization. In particular, the network traffic flow logger framework refers to specific virtual network-based architecture, design features, and functional components that are defined and configured for network traffic flow logging for adjustable processing of network flow events. The network traffic flow logging architecture and framework is configured to meet the goal of maximizing the number of logged flows while avoiding depleting the available memory and consuming a target CPU utilization. In this regard, the modular network traffic flow logging objects may include a software-defined network (SDN), a token bucket having variable capacity, a queueing model, and a throttle rate controller that may be selectively implemented for providing network traffic flow logging. As such, the network flow logger can accommodate multiple and simultaneous tenants in a distributed computing system and further support flow logging network functions that enable high incoming rates of flow events and data.

In operation, the network traffic flow logger can be implemented in a physical node to log network traffic flow events for adjustable processing of network flow events that are processed by one or more virtual machines in a distributed computing system. The network traffic flow logger may be configured as a node agent in a physical node of the distributed computing system. The network traffic flow logger is configured to assign a first throttling rate and a maximum number of tokens threshold for adjustable processing of network flow events. The maximum number of tokens threshold indicates a variable token bucket capacity. The maximum number of tokens threshold is not fixed. The network traffic flow logger is further configured to count a plurality of tokens at the first throttling rate, where tokens are unit representations of flow events. The network traffic flow logger is also configured to access a flow event, where a flow event is quantified based on tokens. The network traffic flow logger determines that the size of the flow event, as quantified in tokens, does not exceed a count of the plurality of tokens or a maximum number of tokens threshold. The network traffic flow logger is also configured to queue the flow event in a queue and based on queueing the flow event, adjust the first throttling rate to a second throttling rate based on a queue length of the queue.

As such, the embodiments described herein improve the functioning of computing devices based on improved network traffic logging functionality. In particular, the improvement includes providing novel operations, data structures, and processes in an ordered combination of steps for faster and more efficient network traffic logging for processing higher volumes of flow events for performing computing tasks.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
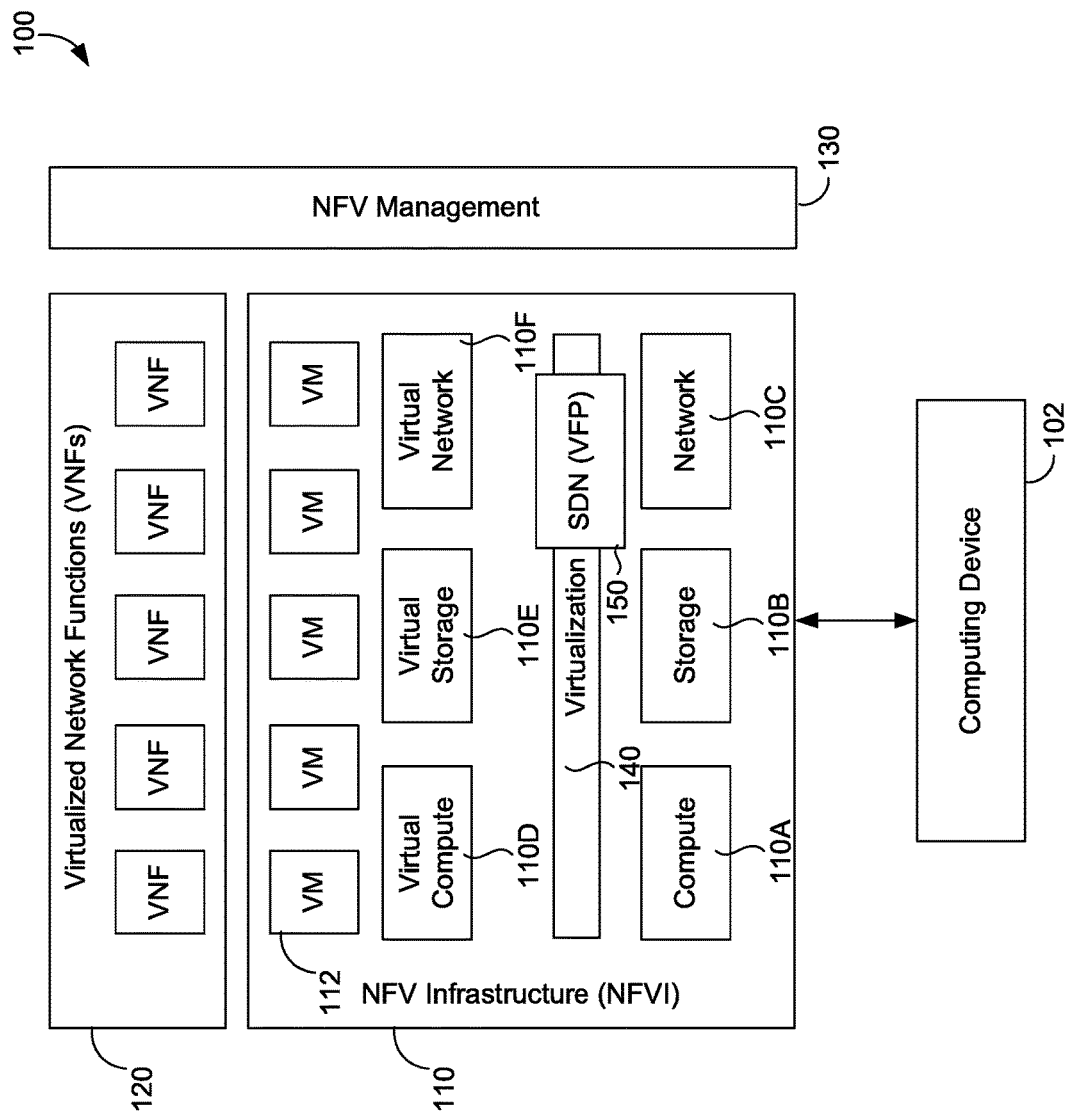
FIG. 1 is a block diagram of an exemplary distributed computing system environment in which embodiments described herein may be employed.

Datacenters include network infrastructures that support communication to, from, and within datacenters. Network Infrastructures in datacenters may be implemented using network virtualization. Network virtualization generally refers to combining hardware and software network resources and network functionality into a single, software-based administrative entity, a virtual network. In distributed computing systems, traditional hardware-based networks have been superseded by network virtualization that combines hardware and software network resources and network functionality into a single, software-based administrative entity, a virtual network. Network virtualization involves platform virtualization (i.e., hardware) and resource virtualization (i.e., compute). Conventional network traffic flow logging systems unfortunately simply rely on traditional or outdated technology for network traffic flow logging techniques. For example, conventional network traffic flow logging systems depend on previously defined solutions based on hardware-based networking or simply do not leverage the combination of a plurality of modern technological advancements. However, the properties of a virtual network (e.g., software define network, hardware and resource virtualization) and innovations in modern technology can be leveraged for improvements in the operations, data structures, and processes for providing network traffic flow logging functionality. The present invention addresses the limitations of conventional network traffic logging and other problems using an improved network traffic flow logger.

Embodiments of the present disclosure provide simple and efficient methods, systems, and computer storage media for providing network traffic flow logging in distributed computing systems, based on a modular network traffic flow logging objects. At a high level, modular network traffic flow logging objects may include a software-defined network (SDN), a variable capacity token bucket, a queueing model, and throttle rate controls that may be selectively implemented for providing network traffic flow logging that supports dynamic adjustable processing of network flow events.

By way of background, in legacy networking, Networking Functions (NFs) may be implemented as a combination of specific software and hardware such as router, Domain Name Server (DNS), and web server. With continued improvements in distributed computing, NF virtualization has been adapted to support rapid deployments of Virtual Networks (VNET), NFs, and many other distributed computing services. For example, instead of using dedicated hardware and software, distributed computing service providers implement resource sharing including sharing hardware resources such as CPUs, storage, and networking infrastructure to offer quick deployment, much higher scalability and management, higher optimization, and lower financial value.

Distributed computing service providers specifically implement Network Functions Virtualization (NFV) for distributed computing with network virtualization. Advantageously, NFV includes decoupling software from hardware, flexible and scalable network function deployment, on-demand networking, lower capital expenses, and optimized network performance and functionality. Network Functions Virtualization (NFV) in particular leverages several modern technology functionalities including: hardware virtualization by means of hypervisors, as well as the usage of virtual Ethernet switches (e.g. vSwitch) for connecting traffic between Virtual Machines (VMs) and physical interfaces. For communication-oriented functions, high-performance packet processing is available through high-speed multi-core CPUs with high I/O bandwidth, the use of smart Ethernet NICs for load sharing and TCP Offloading, and routing packets directly to virtual machine memory. In this regard, virtualization facilitates methods to enhance resource availability and usage by means of orchestration and management mechanisms, applicable to the automatic instantiation of virtual appliances in the network, to the management of resources by assigning virtual appliances to the correct CPU cores, memory and interfaces, to the re-initialization of failed VMs, to snapshot VM states and the migration of VMs in distributed computing system.

Distributed computing systems also operate based on software-defined networks (SDN) that facilitate network management and enable programmatically efficient network configuration in order to improve network performance and monitoring. In an SDN, network control plane is decoupled from data plane such that the network control plane is directly, quickly, and easily programmable. The migration of control plane, which is formerly tightly-bound in network hardware and devices, into more accessible computing devices enables the underlying infrastructure to be abstracted for distributed computing, distributed applications, and network services which can treat the network as a single logical or virtual entity.

With the use of SDN, network access and intelligence are logically centralized in a single software-based SDN controller which contains all information about the network. The network appears to the applications and policy engines as a single logical switch. This greatly simplifies the network design, scalability, operation, and enables large number of SDN policies and network functions virtualization (NFV) to be configured, managed, and optimized. Different applications can thus run without the need for legacy network hardware and software. The latter does not scale well with rapid change and configurations of NFV and requires hundreds of configurations in different network boxes and software.

With SDN, policies can be managed and configured centrally. Distributed computing services offer many NFV such as VNETs with dedicated customer IP address spaces, scalable Software Load Balancers (SLB), Network Security Groups (NSG) and Access Control Lists (ACL), VNET peering, virtual routing tables, bandwidth metering, Quality of Service (QoS), and many more. By way of example, MICROSOFT AZURE implements an SDN platform known as Virtual Filtering Platform (VFP). VFP is an SDN driver on top of WINDOW's Hyper-V hypervisor which provides vSwitch functionalities. VFP is based on the Match-Action Table (MAT) model popularized by projects such as Open-Flow. VFP offers many advantages such as providing programming model for NFVs, stateful network rules, and support quick and rapid deployments of NFVs in distributed computing systems.

Distributed computing systems support hardware virtualization using virtual machines. A virtual machine ("VM"), which is a form of compute, storage, and NIC virtualization, supports the implementation of NFs as software-only entities that run over the NFV Infrastructure (NFVI). A VM may essentially be the relocation of network functions from standalone boxes, based on dedicated hardware, to software appliances running in the distributed computing system. For example, a conventional network function (NF) may advantageously operate on a virtual machine (VM) as a 1:1 mapping model or is decomposed into smaller components called Virtual Network Function Components (VNFC) running on multiple VMs as an 1:N mapping model.

With reference to FIG. 1, FIG. 1 illustrates an exemplary distributed computing system 100 in which implementations of the present disclosure may be employed. In particular, FIG. 1 shows a high level architecture of a distributed computing system 100 with a node agent, virtualized network functions, network function virtualization infrastructure, as shown in more detail in FIG. 2 and FIG. 3. Embodiments of the present disclosure are described herein with reference to examples, such as a distributed computing system having a node agent for network traffic flow logging. A computing device (e.g., computing device 102) may generate network traffic to the distributed computing system 100 and receive network traffic from the distributed computing system 100. The distributed computing system 100 can specifically refer to NFV architectural framework that includes Virtualized Network Functions (VNF) 120, where the VNF is the implementation of Network Functions (NFs) and are deployed and executed on a NFV Infrastructure (NFVI) 110 containing a number of virtual machines (e.g., VM 112)

Figure 2:
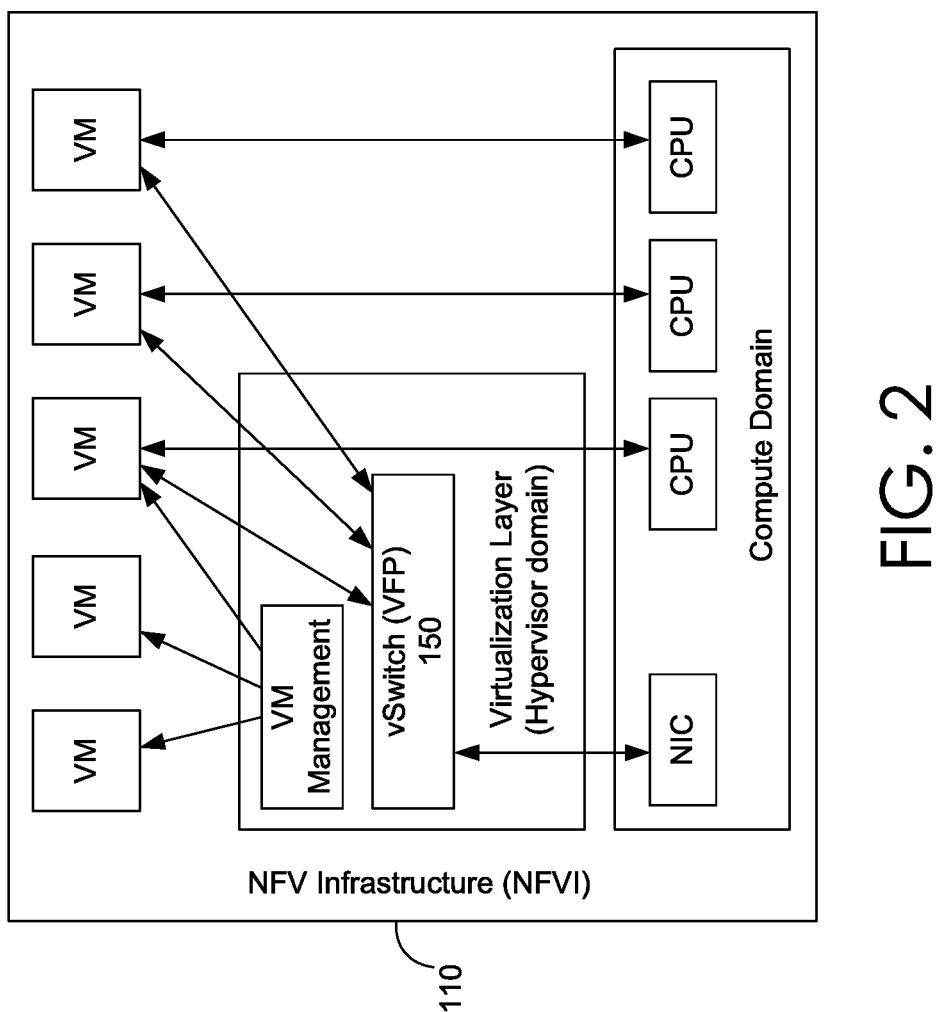
FIG. 2 is a schematic representation of exemplary features of the distributed computing system, in accordance with embodiments described herein.

NFV Infrastructure (NFVI) 110 further includes the diversity of physical resources and virtual resources (e.g., compute, storage, network, virtual compute, virtual storage, and virtual network (i.e., compute 110A, storage 110B, and network 110C, and virtual compute 110D, virtual storage 110E, and virtual network 110F, virtualization 140, and SDN 150 ("Virtual Filtering Platform" 150). NFVI 110 supports the execution of the VNFs. An NFV management engine 130 can implement the orchestration and lifecycle management of physical and software resources, and VMs. SDN and NFV can be implemented to complement each other. For example, both the SDN and the NFV operate to accelerate the innovation of virtualized networking and distributed computing services towards a software-driven networked ecosystem. NFV serves SDN by virtualizing SDN elements such as the SDN controller, SDN data forwarding entities to run in the cloud, thus allows the dynamic migration of these components to their optimal locations. In turn, SDN serves NFV by providing programmable network connectivity between VNFs to achieve optimized traffic engineering and steering. For example, VFP 150, a type of SDN platform, may reside in the Hyper-V virtualization domain and inside NFVI 110. VFP 150, through its programmable model, enables VMs to support the NFs. With reference to FIG. 2, FIG. 2 depicts NFVI 110 and VFP 150 amongst other components, consistent with their depiction in FIG. 1. FIG. 2 illustrates how VMs interact with CPU cores, NICs and VFP 150 (vSwitch). It highlights that VMs can be given transparent access to the physical NICs, exclusive access to specific CPU cores, exclusive access to allocated memory regions; and inter-VM communications.

The modular network traffic flow logging objects further include a queueing model implemented using a node agent. An object can be a variable, data structure, function, method, or model that comprises a location in memory and may be referenced by an identifier. The queue model is based on queueing theory, which is a mathematical method for analyzing and formulating closed-loop solutions for describing waiting time, average number of customers, and arrival and departure processes of a queue. Queueing theory is best used in many several natural phenomenon and applications such as customers arriving to a bank or grocery shop, telephone system, traffic lights, parking lots. Queueing theory is also used in data communication networks, mobile networks, and for modeling packets traffic and characteristics. SDN traffic and engineering can be described using different queueing models (e.g., M/M/1). As such, queueing theory can be used to characterize traffic and flows in NFV infrastructure.

Network traffic logging is responsible for monitoring a flow of network traffic to support adjustable processing of network flow events. The flow may refer to network logical connection (whether connection-oriented or connectionless)

that is represented by the 5-tuple information (Source/Destination IP, Source/Destination Port, and Protocol). The flow may represent a sequence of packets sent from a source to a target unicast, multicast, or broadcast destination. The flow may include of all packets in a transport-layer connection and is mapped as 1:1 to a transport connection. In some implementations, the flow corresponds to one or more Network Security Groups (NSG). An NSG contains a number of security rules that can allow or deny network flows of a VM, VM'S NIC, or VNET based on a criterion (such as allow all traffic targeted to a specific IP address or deny traffic from a source IP address). When an NSG is associated to a VNET, the rules apply to all resources connected to the subnet.

Flow logging may specifically refer to an NF that supports the capacity to store, view, and analyze information about ingress and egress IP traffic of flows that correspond to an NSG. Flow logs may be written in particular computer programming language (e.g., Java Script Object Notation "JSON") formats and show both outbound and inbound flows, metadata such as their timestamp, protocol (TCP or UDP), port (source and destination port), whether they are allowed or denied by a firewall, and their statistics, such as the number of bytes and packets sent and received. Users or tenants in distributed computing systems can define a number of NSGs and determine the need to log their traffic flows in order to troubleshoot connectivity and security issues, and to make sure that network access rules are functioning as expected. In some distributed computing systems, an NF is enabled by running a node agent running on each physical node serving a number of VMs. The node agent imposes some overhead on each node. This overhead may stem from the fact that there are multiple VMs running on the same node and each one of the VMs may have thousands of inbound/outbound flows that can be created or terminated continuously.

Figure 3:
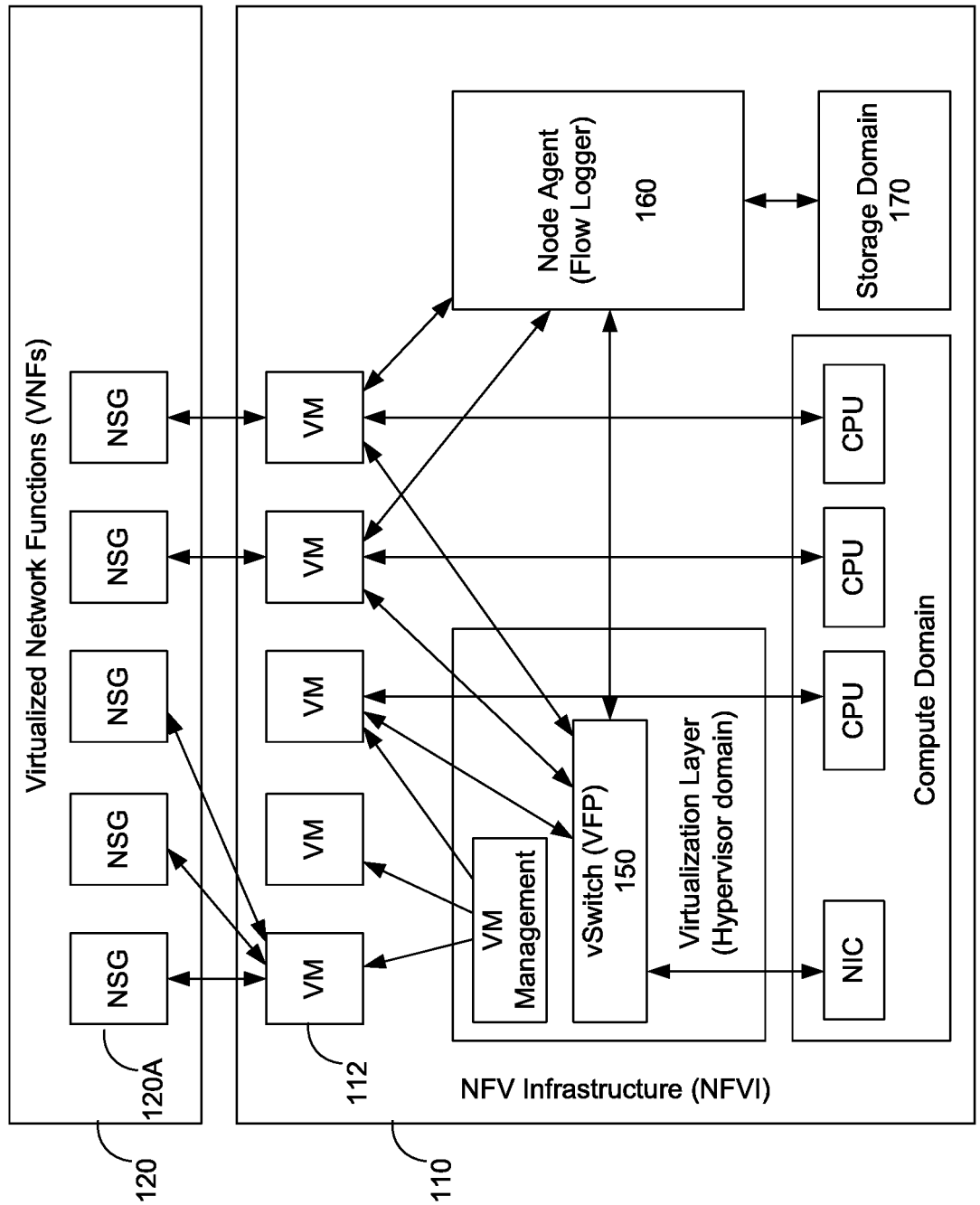
FIG. 3 is a schematic representation of exemplary features of the distributed computing system, in accordance with embodiments described herein.

With reference to FIG. 3, FIG. 3 illustrates the node agent 160 and a corresponding network traffic flow logger (i.e., flow logger). There may be a 1:1 or N:1 mapping between an NSG (e.g., 120A) and VM (e.g., VM 112). Node agent 160 queries the VFP to retrieve information about flows and writes them to the appropriate VM storage (e.g., storage domain 170). VFP 150 and node agent 160 may also communicate through a producer/consumer model. In this producer/consumer model, VFP generates flow events whenever a flow of the respective NSG is either created or terminated, as discussed herein with reference to FIG. 4. The node agent 160 further supports network monitoring and analysis. The node agent 160 may be required to manage a significant amount of flows to process without imposing high overhead on memory consumption and CPU utilization. To formulate the responsibility of the node agent 160, the node agent 160 can be described as an optimization problem that aims at maximizing the number of logged flows subject to the constraints of finite memory and CPU utilization targets. As such, embodiments of the present invention correspond to an architecture and framework that meets the goal of maximizing the number of logged flows while avoiding depleting the available memory and consuming a target CPU utilization.

Figure 4:
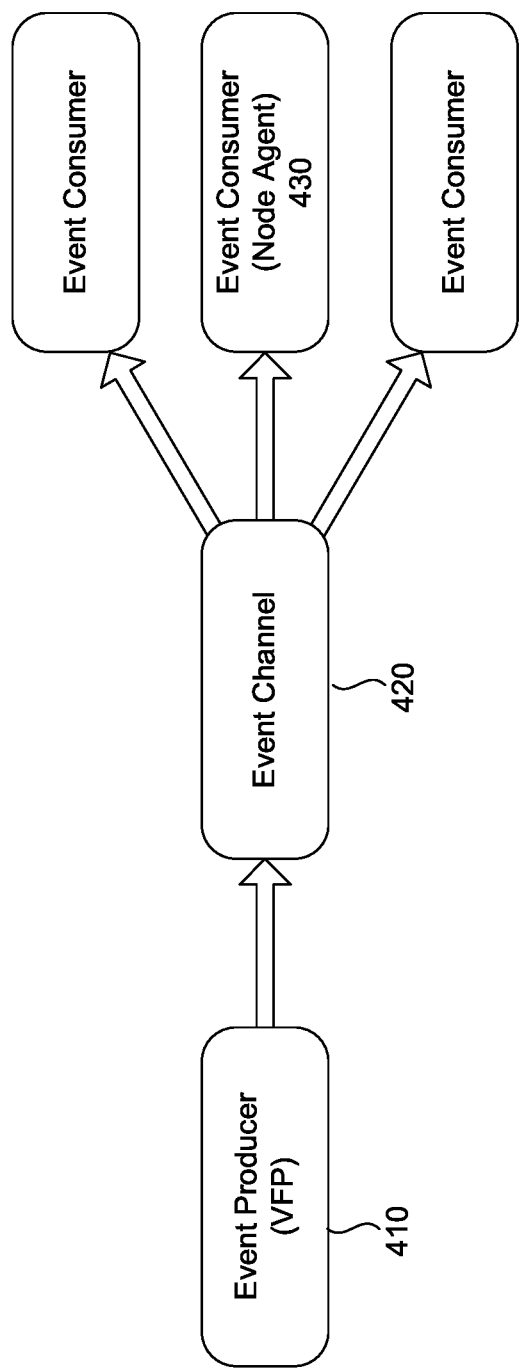
FIG. 4 is a schematic representation of exemplary features of the distributed computing system, in accordance with embodiments described herein.

Embodiments of the present invention can further provide functionality described herein based on the node agent 160 and the VFP 150 communicating through an event producer and event consumer architectural style as show in FIG. 4. Event producer (VFP) 410 generates a stream of flow events and ingests them into the event channel 420. Event consumer 430 listens to the channel and receives the producer events and processes them. Events are delivered in real time and consumers can respond immediately to events as they occur. Producers are decoupled from consumers; a producer does not know which consumers are listening. The ingestion channel is a lossless channel, and all events produced are delivered to the consumer in the same order they are produced without event loss or discard. Events produced are related to a traffic flow, and represent a state of traffic flow such as flow creation, termination, or sampling flow statistics such as bytes and packets transmitted or received.

The modular network traffic flow logging objects further include a token bucket algorithm with variable capacity. The token bucket algorithm can operate with a throttle rate controller to control throttling rates (i.e., token rates). The algorithm may include a single bucket that can hold a maximum number of tokens. A token represents a unit of a single flow and each token is added to the token bucket at a fixed rate. When the flow events are to be checked for conformance to the defined limits, the token bucket is inspected to see if it contains enough tokens. The flow events are quantified based on the token unit of representation. If there are enough tokens in the token bucket, the flow events are allowed to be processed and a number of tokens equal to the number of flows events are debited from the bucket. If there are not enough tokens, the flows events are dropped, and the bucket tokens are kept intact. Depending on the number of VMs, numbers of NSGs, number of flows in each VM, a node agent can thus process flows with an average rate up to the rate at which tokens are added to the bucket, X flows/time unit, and have a maximum flow events burstiness value is determined by the bucket capacity denoted as C. The token bucket algorithm can be described as follows:

A tap (e.g., a tap object of the token bucket with variable capacity) pours a token into the bucket every $\Delta T$ seconds (i.e., one token each 1/X time unit). This is also called throttling rate. The token bucket can hold at the most C tokens. If a token arrives when the bucket is full, the token is discarded. The bucket capacity, C, is not fixed. That is, the bucket capacity is set equal to one time unit worth of token rate (a.k.a, C=X). The token generation rate, X flows/time unit, can be changed. If changed, the bucket capacity, C, is set equal to one time unit of the new token rate and any excess tokens in the buckets are discarded. When a flow event arrives, one token is removed from the bucket, and the flow event is further processed by the node agent. If a flow event arrives while the bucket is empty, the flow event is discarded, and no further processing is done.

Figure 5:
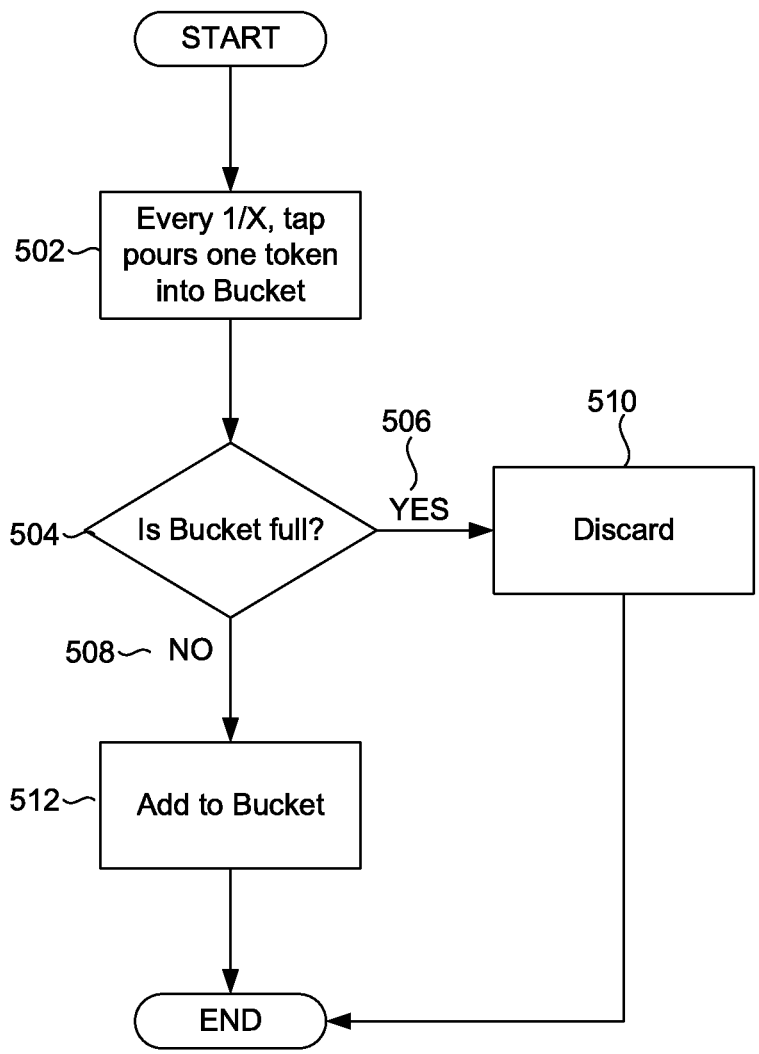
FIG. 5 is a flow diagram representation of a token generation algorithm, in accordance with embodiments described herein.
Figure 6:
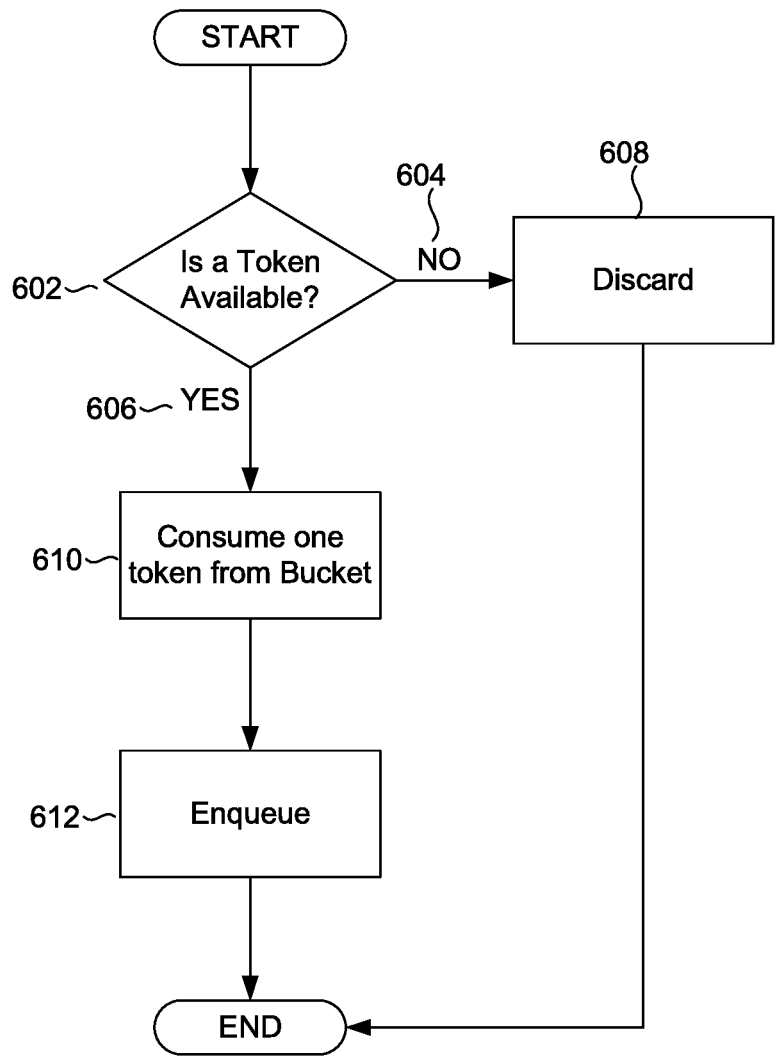
FIG. 6 is a flow diagram representation of a token consumption algorithm, in accordance with embodiments described herein.

Token generation is depicted in FIG. 5 and token consumption by flow events is depicted in FIG. 6. With reference to FIG. 5, initially at block 502, for every 1/X time period, a tap pours one token into a token bucket. At block 504, a determination is made (e.g., yes 506 or no 508) whether or not the token bucket is full. When the determination is yes 506—the token bucket is full—the generated token is discarded at block 510 and the token generation operation ends. When the determination is no 508—the token bucket is not full—the generated token is added to the token bucket. With reference to FIG. 6, initially at block 602, a determination is made (e.g., yes 604 or no 606) whether or not a token is available in the token bucket. When the determination is no 604—a token is not available in the token bucket—the flow event is discarded at block 608 and the token consumption operation ends. When the determination is yes 606—a token is available in the token bucket—at least one token is consumed from the token bucket in block 610. At block 612, the flow event is then queued.

Figure 7:
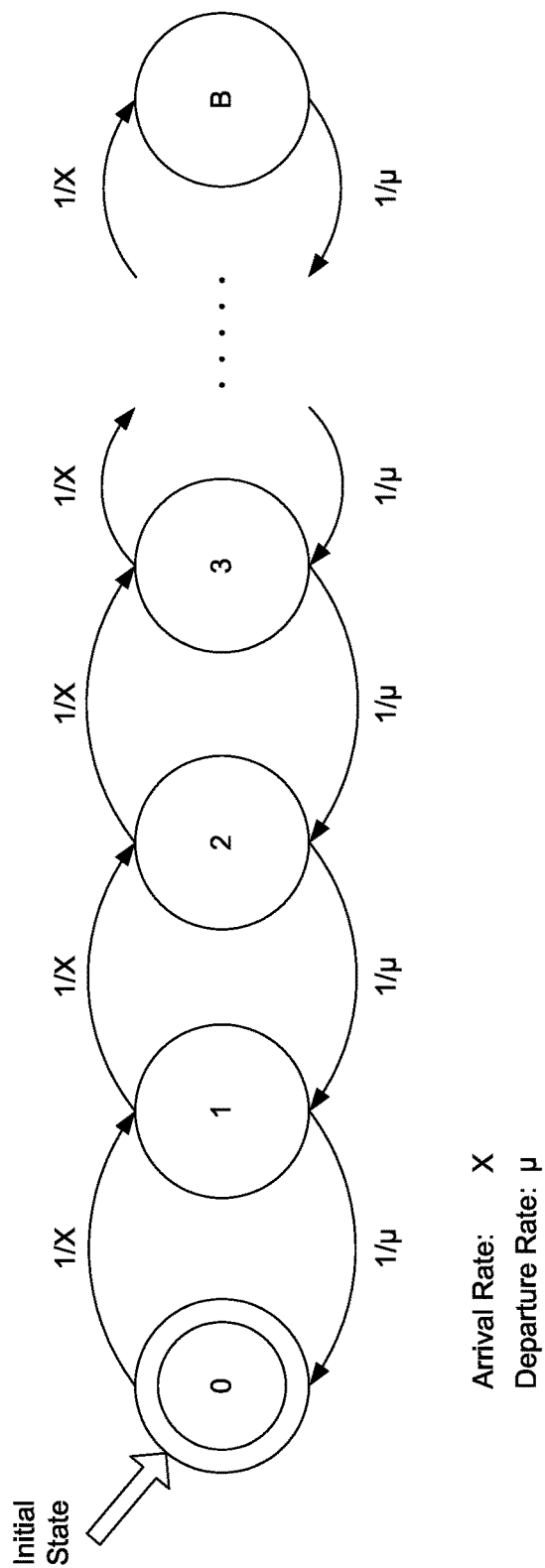
FIG. 7 is a schematic representation of exemplary features of the distributed computing system, in accordance with embodiments described herein.

The modular network traffic flow logging objects further include the queueing model (i.e., M/D/S/B Queueing model), the queue is a stochastic process with a finite state machine representation where a state is in one element in the set {0, 1, 2, 3, . . . }. Each state represents the number of flow events in the system, including any event currently in service. The finite state machine of this queue is depicted in FIG. 7. M: flow events arrival occurs at an average rate X according to a Poisson process and move the process from state i to i+1. D: service time is deterministic with an average service rate of μ. That is, a flow event writer which writes the events to a VM storage has a constant speed and the flow event has a fixed amount of information (i.e., fixed length). S: number of servers (flow writers) serving flow events one at a time from the front of the queue, according to a first-come first-serve discipline. When the service is completed, the flow event leaves the queue and the number of flow events in the system is reduced by one. B: queue length or buffer size is of finite size. There is a maximum number of buffers that can hold a maximum number of flow events in the queue.

Figure 8:
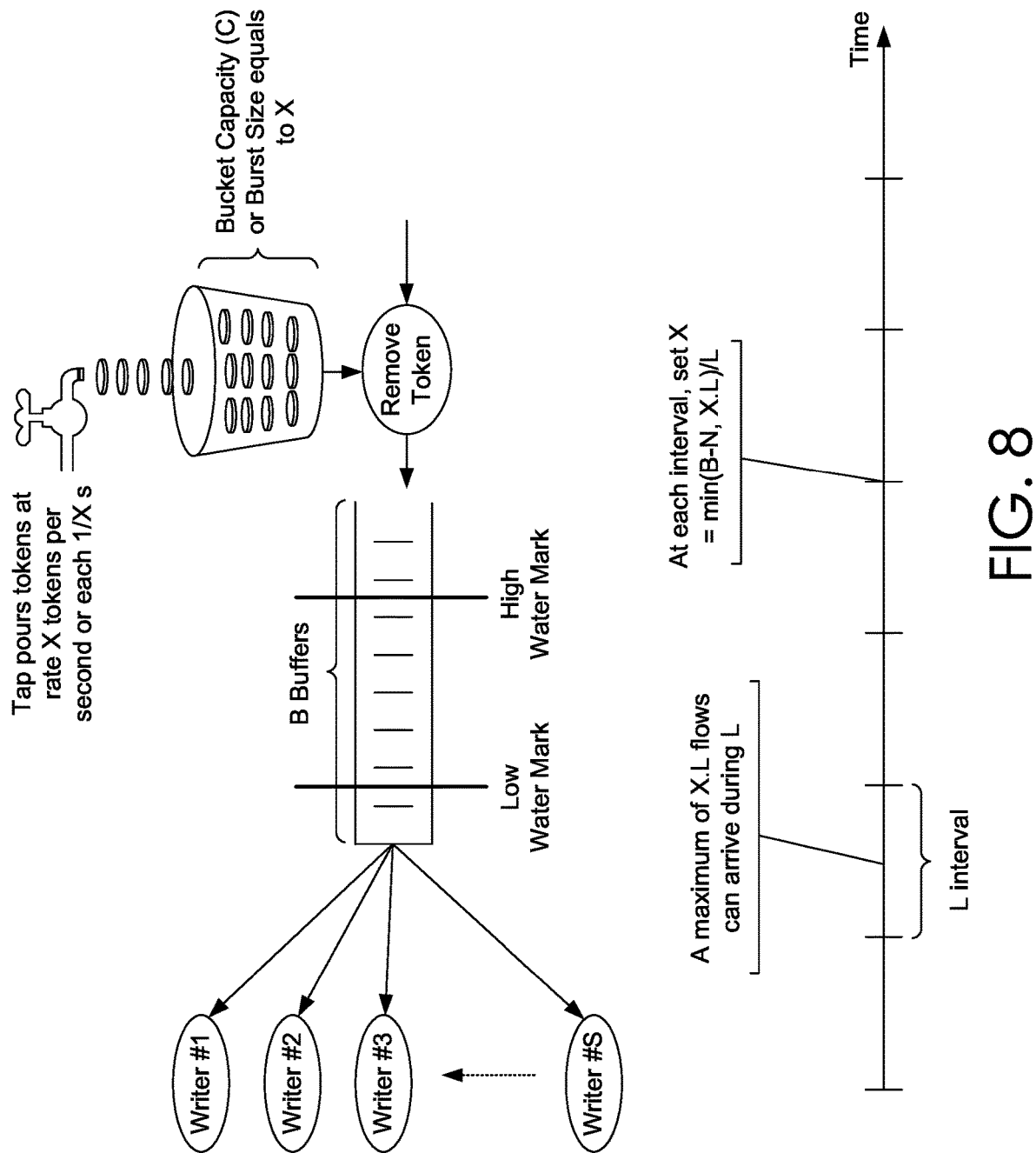
FIG. 8 is a schematic representation of an exemplary network traffic flow logger architecture, in accordance with embodiments described herein.

With reference to FIG. 8, FIG. 8 is an illustration of the architecture of the network traffic flow logger. Flow events are generated from VFP (e.g., VFP 150 communicatively coupled to node agent 160) as a new flow is created or an existing flow is terminated. A node agent (e.g., node agent 160) may also query the VFP 150 periodically to get statistics about a flow, such as total bytes and packets transmitted or received. Flow events arrive at the token bucket in order to guarantee their conformance to an average number of events per second. If they conform to the token rate, they are queued in the queue for processing otherwise they are discarded.

The token rate (or throttling rate) is the tuning knob of the network traffic flow logger to control and cap both memory and CPU usage, alone or in combination, on a physical node. Tap controls the token rate into the token bucket. Token rate and bucket capacity can be chosen according to the following criteria: C<B [Equation 1]. Where C is the token bucket capacity and B is the buffer size of the queue. When the flows are queued, the flow can wait an amount of time until they are finally processed by the flow writers which write them to VM storage. Since the queue has a limited buffer size and the flow processing consumes a CPU time that need to be capped. The flow events rate (corresponding to the token rate) into the queue can be controlled depending on the remaining buffer size or target CPU utilization. The number of flow events waiting in the queue (queue length), N may be checked continuously or periodically (as to check how fast or slow are the flow writers) and depending on the queue length, the token rate can be adjusted to control the incoming flow events into the queue. Two approaches for controlling the token rate (throttling rate) are used; either a continuous-time or discrete-time method for adjusting the token rate.

With reference to the continuous-time adjustment of the throttling rate, the token rate is adjusted every time a flow event is enqueued into the queue. For this purpose, the queue has two water-marks, a low-water mark and a high-water mark. The low-water mark and the high-water mark may be used to define conditions, controls, or rules that when triggered or met indicate how to adjust the throttling rate. For example, if the queue length is or becomes lower than the lower water mark; the token rate is kept unchanged or set to its nominal (original) value. If the queue length grows to be between the low-water mark and high-water mark, the token rate is reduced to half of its nominal value. Finally, when the queue length grows above the high-water mark, the token rate is set to zero.

Figure 9:
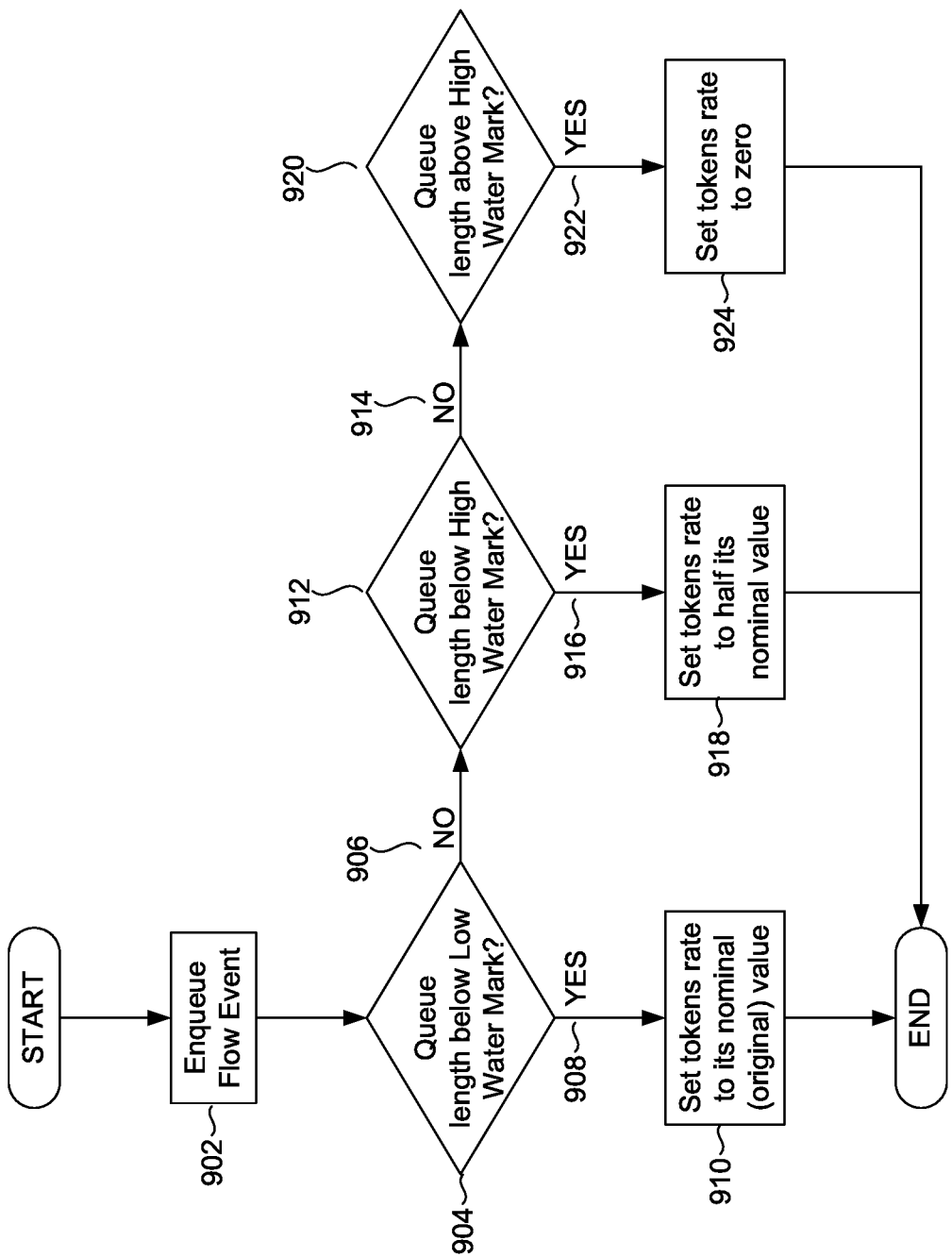
FIG. 9 is a flow diagram representation of continuous-time adjustment of token rates, in accordance with embodiments described herein.

FIG. 9 summarizes the method of using continuous time-checking. Initially at block 902, a flow event is queue into a queue. At block 904 a determination is made (e.g., no 906 or yes 908) whether the queue length is below a low water mark. When the determination is yes 908, at block 910, the throttling rate is set to it nominal or original value. When the determination is no 906, at block 912, a determination is made (e.g., no 914 and yes 916) whether the queue length is below a high water mark. When the determination is yes 916, at block 918, the throttling rate is set to half its nominal value. When the determination is no 914, a determination (e.g., yes 922) is made that the queue length is above a high water mark. When the determination is yes 922, at block 924, the throttling rate is set to zero.

With reference to the discrete-time adjustment of throttling rate, the queue length and token rate are checked and adjusted periodically. That is, every fixed amount of time, L, check the queue length and adjust the token rate accordingly. The discrete-time adjustment is also associated with conditions, controls, or rules that when triggered or met indicate how to adjust the throttling rate. As such, the token rate can be chosen according to the following formula: XL<B [Equation 2]. That is, the number of flows events per interval must not exceed the queue buffer size. At the end of each interval, the token rate is adjusted according to the following formula: X=min(B−N, XL)/L. [Equation 3]. To avoid a possible scenario where the token rate is ping-pong, that is, token rate is decreased and then increased in consequent intervals, token rate, Equation 2 can be set as the following constraint:

$$XL < \frac{B}{2}. \quad \text{[Equation 4]}$$

Figure 10:
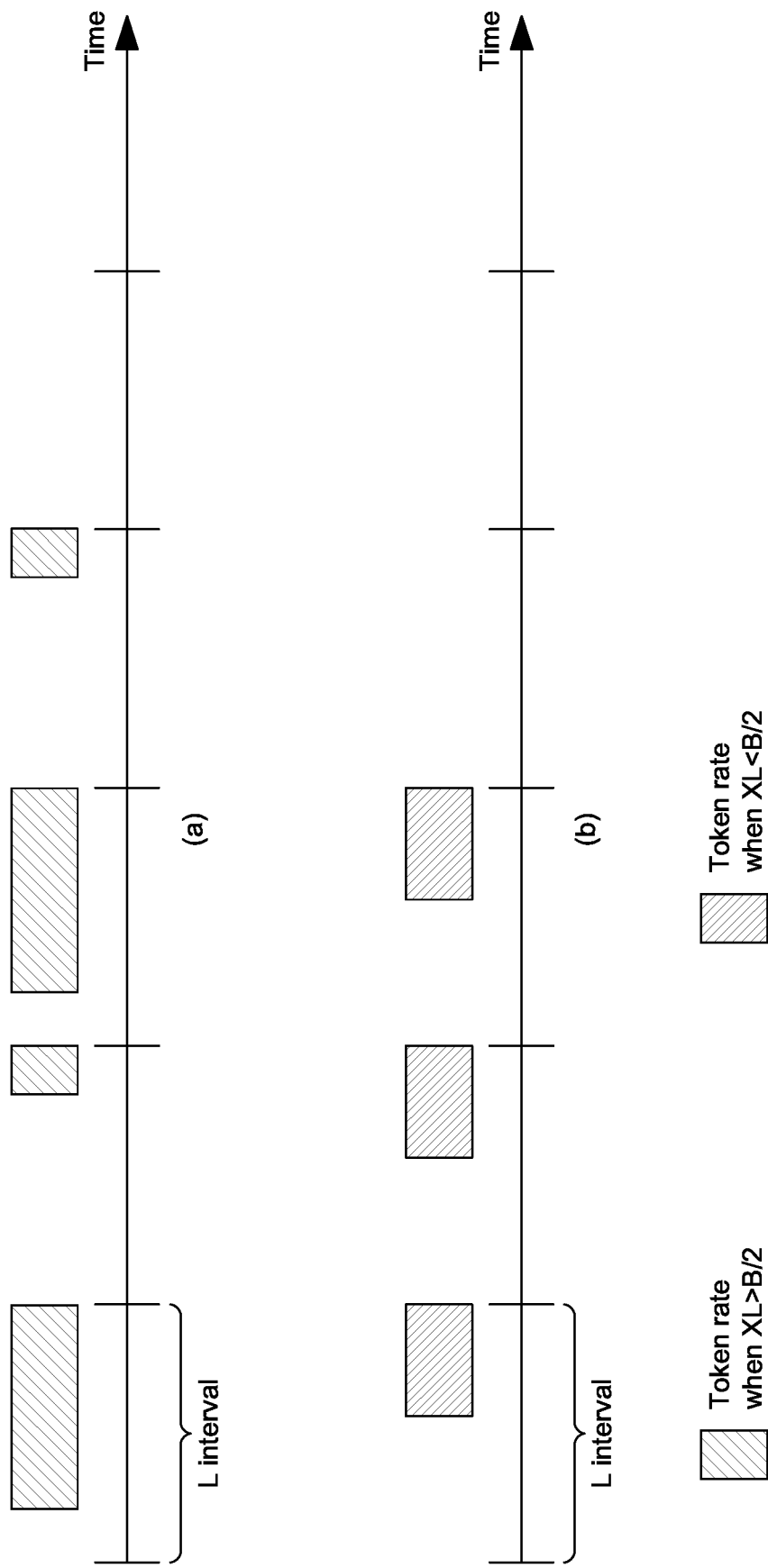
FIG. 10 is a schematic representation discrete-time adjustments of token rates, in accordance with embodiments described herein.

As such, the token rate per L interval is chosen such that it does not exceed half of the buffer size. Using Equation 4 guarantees that the token rate does not fluctuate. With reference to FIG. 10, FIG. 10 depicts two possible scenarios timeline 1010A and timeline 1010B, where the token rate fluctuates in each interval timeline 1010A and does not fluctuate in timeline 1010B. In each interval, a maximum available buffer size, B is available. Timeline 1010A shows how the token rate is ping-pong when it is greater than half of the buffer size. Timeline 1010B shows a steady token rate as a result of choosing it according to Equation 4.

Figure 11:
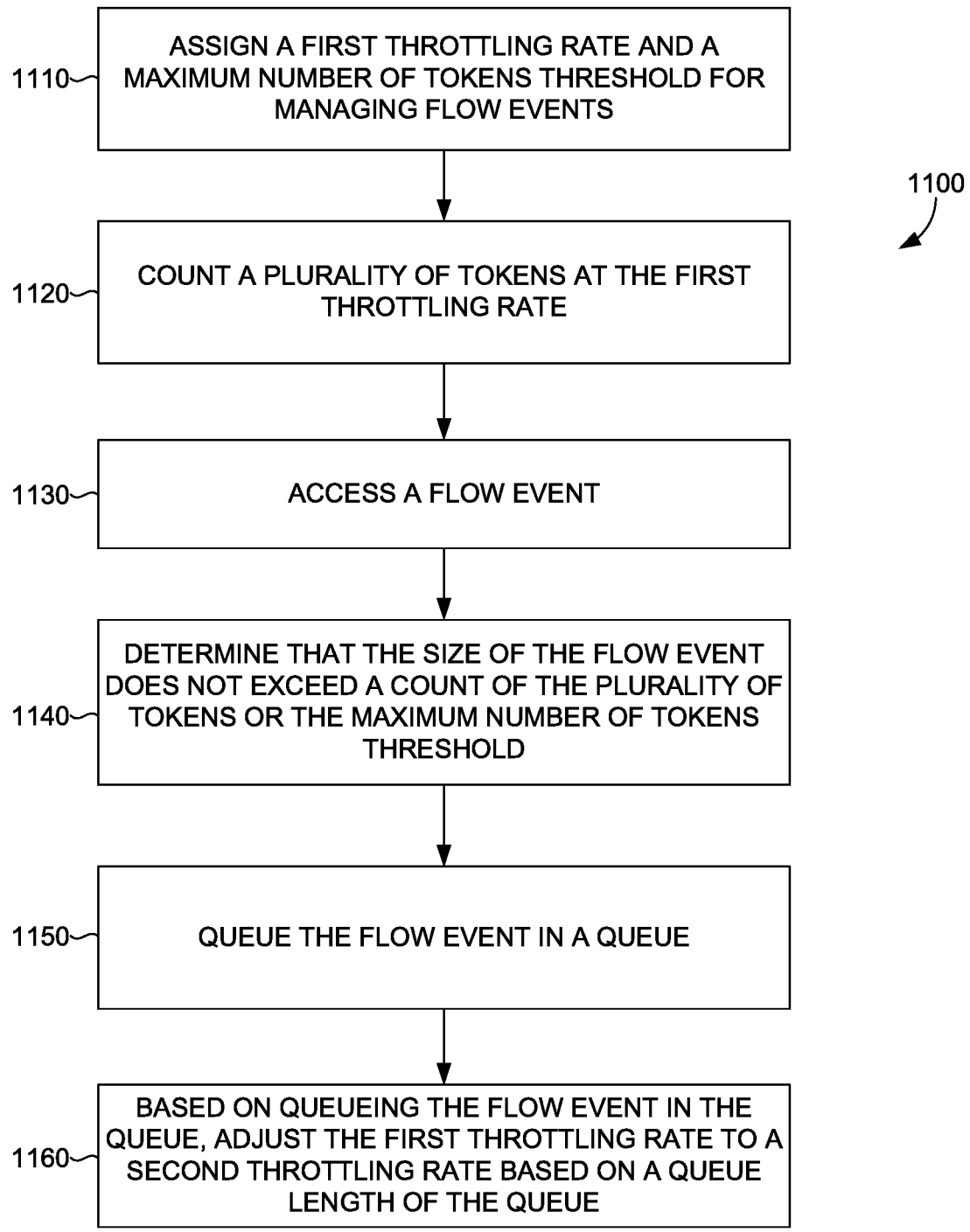
FIG. 11 is a flow diagram showing an exemplary method for implementing a network traffic flow logging in a distributed computing system, in accordance with embodiments described herein.
Figure 12:
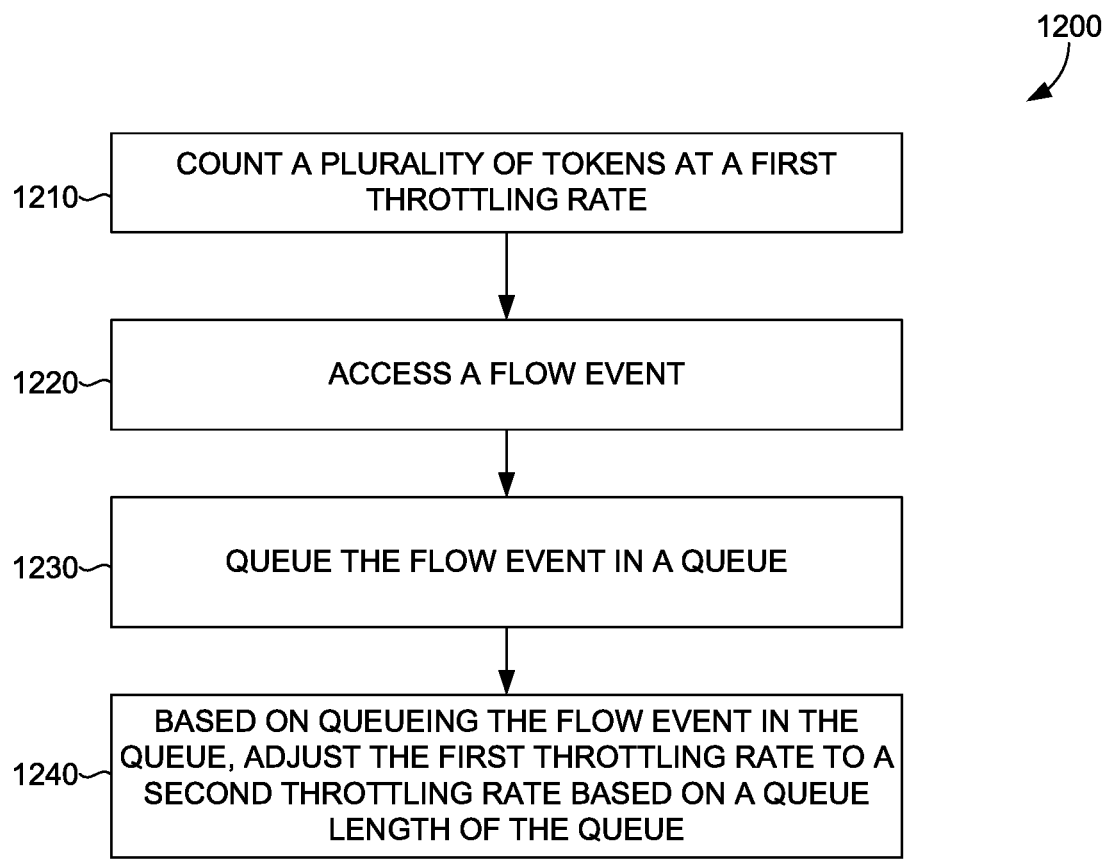
FIG. 12 is a flow diagram showing an exemplary method for implementing a network traffic flow logging in a distributed computing system, in accordance with embodiments described herein.

With reference to FIGS. 11 and 12, flow diagrams are provided illustrating methods for implementing a network traffic flow logger for adjustable processing of network traffic flow events. The methods can be performed using the distributed computing system described herein. In embodiments, one or more computer storage media having computer-executable instructions embodied thereon that, when executed, by one or more processors, can cause the one or more processors to perform the methods in the network traffic flow logger.

Turning now to FIG. 11, a flow diagram is provided that illustrates methods for implementing a network traffic flow logger for adjustable processing of network traffic flow events in a distributed computing system. Initially at block 1110, a first throttling rate and a maximum number of tokens threshold are assigned for adjustably processing network traffic flow events. The maximum number of tokens threshold indicates a variable token bucket capacity. The maximum number of tokens threshold is not fixed. A software-defined network component of the distributed computing system is communicatively coupled to the node agent via a producer-consumer model. The software-defined network component provides logically centralized controls of virtual network infrastructure components comprising virtual machines and network functions. The node agent operates within a physical node that serves a plurality of virtual machines. Adjusting the first throttling rate to the second throttling rate is further based on constraints comprising a CPU utilization target or memory consumption target associated with the physical node.

At block 1120, a plurality of tokens is counted at the first throttling rate. The tokens are unit representations of flow events. At block 1130, a flow event is accessed, where a flow event is quantified based on tokens. At block 1140, it is determined that the size of the flow event, as quantified in tokens, does not exceed a count of the plurality of tokens or the maximum number of tokens threshold. At block 1150, the flow event is queued in a queue. The queue is based on an M/D/S/B queue model, wherein M indicates an arrival rate of flow events, D indicates a service time of flow events, S indicates a number of servers serving flow events, and B indicates the queue length of the queue.

At block 1160, based on queueing the flow event in the queue, the first throttling rate is adjusted to a second throttling rate based on a queue length of the queue. Adjusting the first throttling rate comprises adjusting the maximum number of tokens threshold, based on the second throttling rate. Adjusting the maximum number of tokens threshold, based on the second throttling rate, increases or decreases the maximum number of tokens threshold, where an updated maximum number of tokens threshold is equal to one time unit of the second throttling rate. Adjusting the first throttling rate can be based on a continuous-time adjustment operation, where the continuous-time adjustment operation comprises adjusting the first token rate with each flow event that is enqueued into the queue. Adjusting the first throttling rate is based on conditions associated with a low-water mark and a high-water-mark of the queue. The second throttling rate is configurable to each of the following: the first throttling rate, half of the first throttling rate, and zero, based on conditions associated with the low-water mark and the high-water-mark of the queue. In addition, adjusting the first token rate can be based on a discrete-time adjustment operation. The discrete-time adjustment operation comprises: inspecting the queue length and the first throttling rate; and adjusting the first throttling rate periodically based on a fixed amount of time, wherein a number of flow events per the fixed amount of time do not exceed the queue length.

Turning now to FIG. 12, a flow diagram is provided that illustrates methods for implementing a network traffic flow logger for adjustable processing of network traffic flow events in a distributed computing system. Initially at block 1210, a plurality of tokens is counted at a first throttling rate. The first throttling rate is associated with a maximum number of tokens threshold. At block 1220, a flow event is accessed, where a flow event is quantified based on tokens. At block 1230, the flow event is queued in a queue, based on a count of the plurality of tokens or the maximum number of tokens threshold. At block 1240, based on queueing the flow event, the first throttling rate token rate is adjusted to a second throttling rate based on a queue length of the queue. Adjusting the first throttling rate comprises adjusting the maximum number of tokens threshold, based on the second throttling rate.

Accordingly, a distributed computing system can include the network traffic flow logging based on the modular network traffic flow objects in the network traffic flow logging framework. The architecture, design aspects, and components of the framework correspond to the modular network traffic flow objects discussed above. In this regard, the distributed computing system can accommodate an increased number of tenants that have enabled flow logging NF while at the same time accommodating high incoming rates of flow events and data. Additional improvements can be observed in an increased capacity in throttling. For example, a throttling rate would increase from 50,000 flows per second to 300,000 flows per second. As such, a significant amount of efficiency gains in processing flow events, with logging enabled, using embodiments of the present invention.

With reference to the distributed computing system 100, embodiments described herein can improve network traffic flow logging. The distributed computing system components refer to integrated components that implement network traffic flow logging. The integrated components refer to the hardware architecture and software framework that support functionality using the distributed computing system components. The hardware architecture refers to physical components and interrelationships thereof and the software framework refers to software providing functionality that can be implemented with hardware operated on a device. The end-to-end software-based distributed computing system can operate within the other components to operate computer hardware to provide distributed computing system functionality. As such, the distributed computing system components can manage resources and provide services for the distributed computing system functionality. Any other variations and combinations thereof are contemplated with embodiments of the present invention.

By way of example, the distributed computing system can include an API library that includes specifications for routines, data structures, object classes, and variables may support the interaction the hardware architecture of the device and the software framework of the distributed computing system. These APIs include configuration specifications for the distributed computing system such that the components therein can communicate with each other in video management, as described herein.

Having identified various components of the distributed computing system 100, it is noted that any number of components may be employed to achieve the desired functionality within the scope of the present disclosure. Although the various components of FIG. 11 are shown with lines for the sake of clarity, in reality, delineating various components is not so clear, and metaphorically, the lines may more accurately be grey or fuzzy. Further, although some components of FIG. 11 are depicted as single components, the depictions are exemplary in nature and in number and are not to be construed as limiting for all implementations of the present disclosure. The distributed computing system 100 functionality can be further described based on the functionality and features of the above-listed components.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Figure 13:
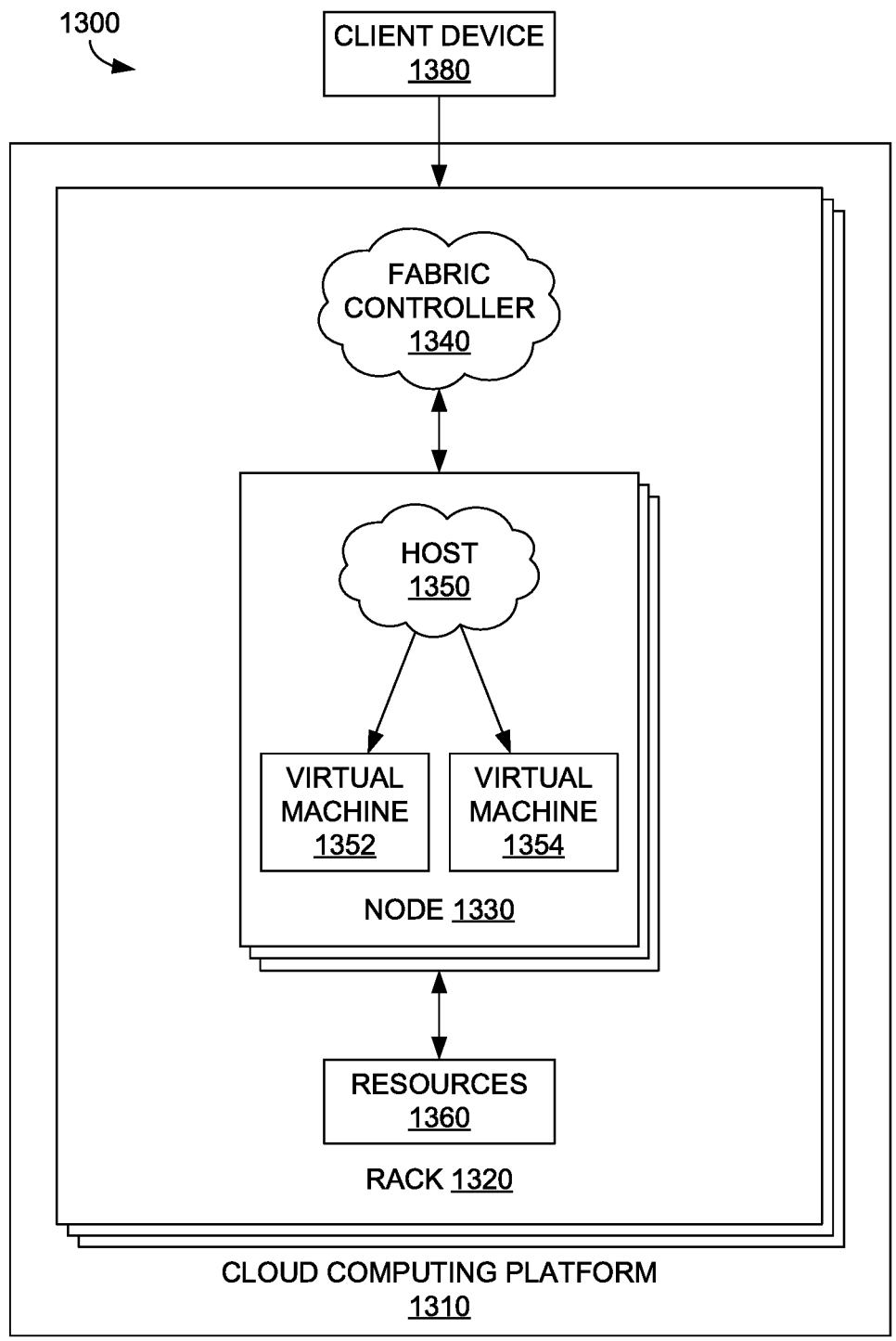
FIG. 13 is a block diagram of an exemplary distributed computing environment suitable for use in implementing embodiments described herein.

Referring now to FIG. 13, FIG. 13 illustrates an exemplary distributed computing environment 1300 in which implementations of the present disclosure may be employed. In particular, FIG. 13 shows a high level architecture a cloud computing platform 1310 supporting a distributed computing system ("system"), where the system supports implementing a network traffic flow logger. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Data centers can support the distributed computing environment 1300 that includes the cloud computing platform 1310, rack 1320, and node 1330 (e.g., computing devices, processing units, or blades) in rack 1320. The system can be implemented with a cloud computing platform 1310 that runs cloud services across different data centers and geographic regions. The cloud computing platform 1310 can implement a fabric controller 1340 component for provisioning and managing resource allocation, deployment, upgrade, and management of cloud services. Typically, the cloud computing platform 1310 acts to store data or run service applications in a distributed manner. The cloud computing infrastructure 1310 in a data center can be configured to host and support operation of endpoints of a particular service application. The cloud computing infrastructure 1310 may be a public cloud, a private cloud, or a dedicated cloud.

The node 1330 can be provisioned with a host 1350 (e.g., operating system or runtime environment) running a defined software stack on the node 130. Node 1330 can also be configured to perform specialized functionality (e.g., compute nodes or storage nodes) within the cloud computing platform 1310. The node 1330 is allocated to run one or more portions of a service application of a tenant. A tenant can refer to a customer utilizing resources of the cloud computing platform 1310. Service application components of the cloud computing platform 1310 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by the nodes 1330, the nodes may be partitioned into virtual machines (e.g., virtual machine 1352 and virtual machine 1354). Physical machines can also concurrently run separate service applications. The virtual machines or physical machines can be configured as individualized computing environments that are supported by resources 1360 (e.g., hardware resources and software resources) in the cloud computing platform 1310. It is contemplated that resources can be configured for specific service applications. Further, each service application may be divided into functional portions such that each functional portion is able to run on a separate virtual machine. In the cloud computing platform 1310, multiple servers may be used to run service applications and perform data storage operations in a cluster. In particular, the servers may perform data operations independently but exposed as a single device referred to as a cluster. Each server in the cluster can be implemented as a node.

Client device 1380 may be linked to a service application in the cloud computing platform 1310. The client device 1380 may be any type of computing device, which may correspond to computing device 600 described with reference to FIG. 6, for example. The client device 1380 can be configured to issue commands to cloud computing platform 1310. In embodiments, client device 1380 may communicate with service applications through a virtual Internet Protocol (IP) and load balancer or other means that directs communication requests to designated endpoints in the cloud computing platform 1310. The components of cloud computing platform 1310 may communicate with each other over a network (not shown), which may include, without limitation, one or more local area networks (LANs) and/or wide area networks (WANs).

Figure 14:
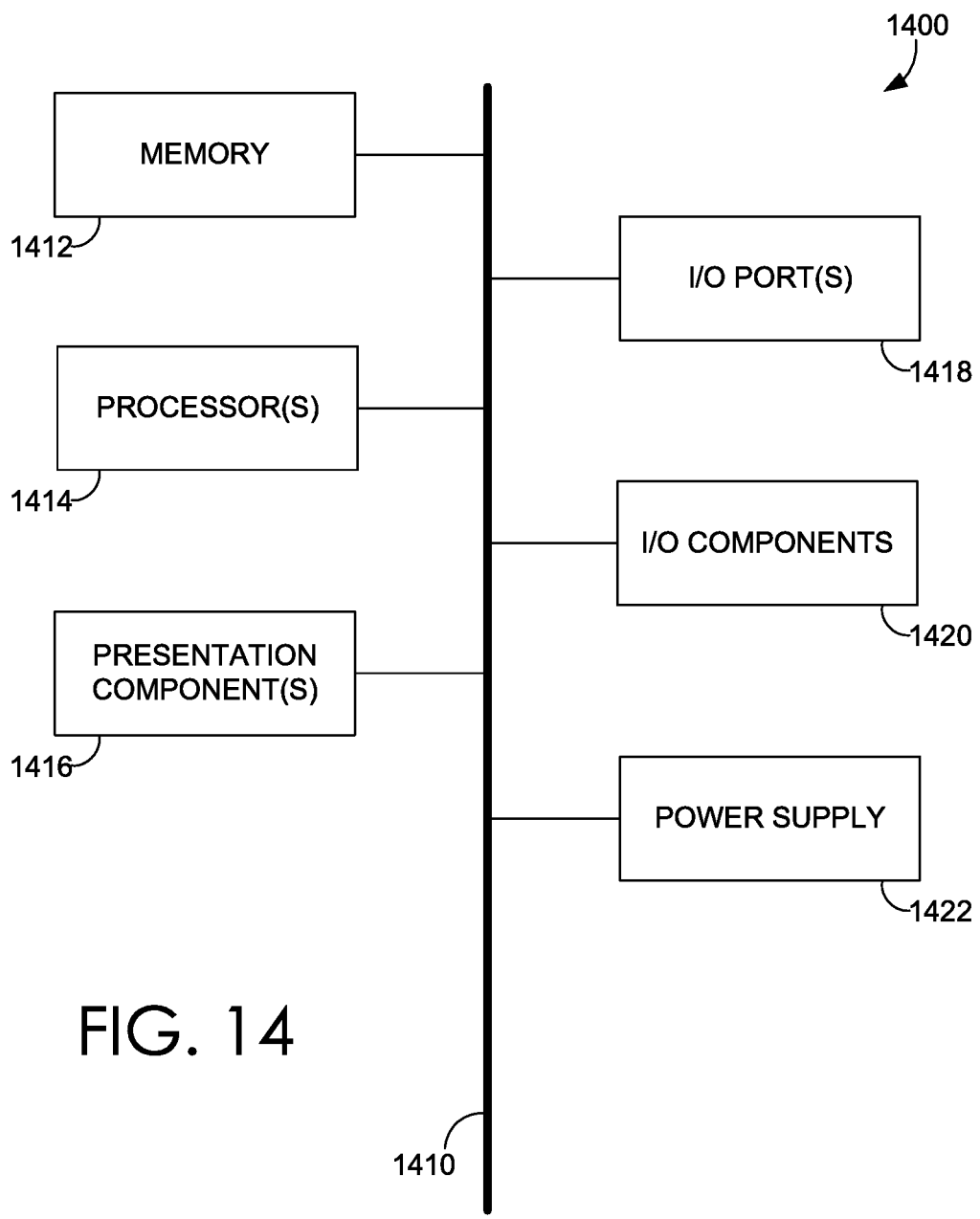
FIG. 14 is a block diagram of an exemplary computing environment suitable for use in implementing embodiments described herein.

Having described embodiments of the present invention, an exemplary operating environment in which embodiments of the present invention may be implemented is described below in order to provide a general context for various aspects of the present invention. Referring initially to FIG. 14 in particular, an exemplary operating environment for implementing embodiments of the present invention is shown and designated generally as computing device 1400. Computing device 1400 is but one example of a suitable computing environment and is not intended to suggest any limitation as to the scope of use or functionality of the invention. Neither should the computing device 1400 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 14, computing device 1400 includes a bus 1410 that directly or indirectly couples the following devices: memory 1412, one or more processors 1414, one or more presentation components 1416, input/output ports 1418, input/output components 1420, and an illustrative power supply 1422. Bus 1410 represents what may be one or more busses (such as an address bus, data bus, or combination thereof). Although the various blocks of FIG. 14 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 14 is merely illustrative of an exemplary computing device that can be used in connection with one or more embodiments of the present invention. Distinction is not made between such categories as "workstation," "server," "laptop," "hand-held device," "mobile device," "wearable device," etc., as all are contemplated within the scope of FIG. 14 and reference to "computing device."

Computing device 1400 typically includes a variety of computer-readable media. Computer-readable media can be any available media that can be accessed by computing device 1400 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1412 includes computer storage media in the form of volatile and/or nonvolatile memory. The memory may be removable, non-removable, or a combination thereof. Exemplary hardware devices include solid-state memory, hard drives, optical-disc drives, etc. Computing device 1400 includes one or more processors that read data from various entities such as memory 1412 or I/O components 1420. Presentation component(s) 1416 present data indications to a user or other device. Exemplary presentation components include a display device, speaker, printing component, vibrating component, etc.

I/O ports 1418 allow computing device 1400 to be logically coupled to other devices including I/O components 1420, some of which may be built in. Illustrative components include a microphone, joystick, game pad, satellite dish, scanner, printer, wireless device, etc.

The subject matter of embodiments of the disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters" using communication media described herein. Also, the word "initiating" has the same broad meaning as the word "executing or "instructing" where the corresponding action can be performed to completion or interrupted based on an occurrence of another action. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the distributed computing system and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. A system for network traffic flow logging for adjustable processing of network traffic flow events, the system comprising:
one or more processors; and
a computer-readable storage medium having computer-executable instructions stored thereupon which, when executed by the one or more processors, cause the system to perform operations comprising:
assign a first throttling rate and a maximum number of tokens threshold, for adjustably processing network traffic flow events, wherein the maximum number of tokens threshold indicates a variable token bucket capacity, wherein the maximum number of tokens threshold is not fixed, the network traffic flow events corresponding to ingress and egress IP traffic of flows corresponding to one or more network security groups of a virtual network comprising one or more nodes that comprise one or more virtual machines;
count a plurality of tokens at the first throttling rate, wherein tokens are unit representations of flow events;
access a flow event corresponding to the one or more network security groups, wherein a flow event is quantified based on tokens;
determine that the size of the flow event, as quantified in tokens, does not exceed a count of the plurality of tokens or the maximum number of tokens threshold;
queue the flow event in a queue;
count a number of flow events in the queue to determine a queue length of the queue, wherein the queue length of the queue indicates at least two flow events waiting in the queue; and
adjust the first throttling rate to a second throttling rate based on the queue length meeting or exceeding a threshold count of flow events, wherein adjusting the first throttling rate comprises adjusting the maximum number of tokens threshold, based on the second throttling rate.

2. The system of claim 1, wherein a software-defined network component of the virtual network is communicatively coupled to a node agent via a producer-consumer model, the node agent comprising a network traffic flow logger, wherein the software-defined network component provides logically centralized controls of virtual network infrastructure components comprising virtual machines and network functions.

3. The system of claim 2, wherein the node agent operates within a physical node that serves a plurality of virtual machines, wherein adjusting the first throttling rate to the second throttling rate is further based on constraints comprising a CPU utilization target or memory consumption target associated with the physical node.

4. The system of claim 1, wherein adjusting the first throttling rate to the second throttling rate, comprising adjusting the maximum number of tokens threshold, based on the second throttling rate, increases or decreases the maximum number of tokens threshold, wherein an updated maximum number of tokens threshold is equal to a number of tokens associated with one time unit of the second throttling rate.

5. The system of claim 1, wherein the queue is based on an M/D/S/B queue model, wherein M indicates an arrival rate of flow events, D indicates a service time of flow events, S indicates a number of servers serving flow events, and B indicates the queue length of the queue.

6. The system of claim 1, wherein adjusting the first throttling rate is based on a continuous-time adjustment operation, wherein the continuous-time adjustment operation comprises adjusting the first token rate with each flow event that is enqueued into the queue, wherein adjusting the first throttling rate is based on conditions associated with a low-water mark and a high-water-mark of the queue.

7. The system of claim 6, wherein the second throttling rate is configurable to each of the following: the first throttling rate, half of the first throttling rate, and zero, based on conditions associated with the low-water mark and the high-water-mark of the queue.

8. The system of claim 1, wherein adjusting the first token rate is based on a discrete-time adjustment operation, wherein the discrete-time adjustment operation comprises:
inspecting the queue length and the first throttling rate; and
adjusting the first throttling rate periodically based on a fixed amount of time, wherein a number of flow events per the fixed amount of time do not exceed the queue length.

9. One or more computer storage media having computer-executable instructions embodied thereon that, when executed, by one or more processors of a computing system, cause the computing system to perform operations comprising:
counting a plurality of tokens at a first throttling rate, wherein the first throttling rate is associated with a maximum number of tokens threshold;
accessing a flow event, wherein a flow event is quantified based on tokens and the flow event corresponds to ingress and egress IP traffic of flows corresponding to one or more network security groups of a virtual network comprising one or more nodes that comprise one or more virtual machines;
queueing the flow event in a queue, based on a count of the plurality of tokens or the maximum number of tokens threshold; and
counting a number of flow events in the queue to determine a queue length of the queue, wherein the queue length of the queue indicates at least two flow events waiting in the queue; and,
adjusting the first throttling rate token rate to a second throttling rate based on the queue length meeting or exceeding a threshold count of flow events, wherein adjusting the first throttling rate comprises adjusting the maximum number of tokens threshold, based on the second throttling rate.

10. The media of claim 9, wherein the maximum number of tokens threshold indicates a variable token bucket capacity, the maximum number of tokens threshold is not fixed, and wherein adjusting the first throttling rate to the second throttling rate, comprising adjusting the maximum number of tokens threshold, based on the second throttling rate, increases or decreases the maximum number of tokens threshold, wherein an updated maximum number of tokens threshold is equal to a number of tokens associated with one time unit of the second throttling rate.

11. The media of claim 9, wherein queueing the flow event in the queue, based on the count of the plurality of tokens or the maximum number of tokens threshold comprises determining that the size of the flow event, as quantified in tokens, does not exceed a count of the plurality of tokens or the maximum number of tokens threshold.

12. The media of claim 9, wherein the operations are performed by a node agent comprising a network traffic flow logger, wherein the node agent operates within a physical node that serves a plurality of virtual machines, and wherein adjusting the first throttling rate to the second throttling rate is further based on constraints comprising a CPU utilization target or memory consumption target associated with the physical node.

13. The media of claim 9, wherein adjusting the first throttling rate is based on a continuous-time adjustment operation, wherein the continuous-time adjustment operation comprises adjusting the first token rate with each flow event that is enqueued into the queue, wherein adjusting the first throttling rate is based on conditions associated with a low-water mark and a high-water-mark of the queue.

14. The media of claim 9, wherein adjusting the first token rate is based on a discrete-time adjustment operation, wherein the discrete-time adjustment operation comprises:
   inspecting the queue length and the first throttling rate; and
   adjusting the first throttling rate periodically based on a fixed amount of time, wherein a number of flow events per the fixed amount of time do not exceed the queue length.

15. A method for network traffic flow logging for adjustable processing of network traffic flow events, the method comprising:
   counting a plurality of tokens a first throttling rate, wherein the first throttling rate is associated with a variable maximum number of tokens;
   accessing a flow event, wherein a flow event is quantified based on tokens and wherein the flow event is associated with ingress and egress IP traffic of flows corresponding to one or more network security groups of a virtual network comprising one or more nodes that comprise one or more virtual machines;
   queueing the flow event in a queue, based on a count of the plurality of tokens and the variable maximum number of tokens; and
   counting a number of flow events in the queue to determine a queue length of the queue, wherein the queue length of the queue indicates at least two flow events waiting in the queue; and,
   adjusting the first throttling rate to a second throttling rate based on the queue length meeting or exceeding a threshold count of flow events, wherein adjusting the first throttling rate comprises adjusting the maximum number of tokens threshold based on the second throttling rate.

16. The method of claim 15, wherein the maximum number of tokens threshold indicates a variable token bucket capacity, wherein the maximum number of tokens threshold is not fixed; and wherein adjusting the first throttling rate to the second throttling rate, comprising adjusting the maximum number of tokens threshold, based on the second throttling rate, increases or decreases the maximum number of tokens threshold, wherein an updated maximum number of tokens threshold is equal to a number of tokens associated with one time unit of the second throttling rate.

17. The method of claim 15, wherein queueing the flow event in the queue, based on the count of the plurality of tokens or the maximum number of tokens threshold comprises determining that the size of the flow event, as quantified in tokens, does not exceed a count of the plurality of tokens or the maximum number of tokens threshold.

18. The method of claim 15, wherein the method is performed by a node agent comprising a network traffic flow logger, wherein the node agent operates within a physical node that serves a plurality of virtual machines, and wherein adjusting the first throttling rate to the second throttling rate is further based on constraints comprising a CPU utilization target or memory consumption target associated with the physical node.

19. The method of claim 15, wherein adjusting the first throttling rate is based on a continuous-time adjustment operation, wherein the continuous-time adjustment operation comprises adjusting the first token rate with each flow event that is enqueued into the queue, wherein adjusting the first throttling rate is based on conditions associated with a low-water mark and a high-water-mark of the queue.

20. The method of claim 15, wherein adjusting the first token rate is based on a discrete-time adjustment operation, wherein the discrete-time adjustment operation comprises:
   inspecting the queue length and the first throttling rate; and
   adjusting the first throttling rate periodically based on a fixed amount of time, wherein a number of flow events per the fixed amount of time do not exceed the queue length.

* * * * *